United States Patent [19]
Gonzales et al.

[11] Patent Number: 5,414,469
[45] Date of Patent: May 9, 1995

[54] MOTION VIDEO COMPRESSION SYSTEM WITH MULTIRESOLUTION FEATURES

[75] Inventors: Cesar A. Gonzales, Katonah, N.Y.; Dov Ramm, Menashe, Israel; Eric Viscito, Danbury, Conn.

[73] Assignee: International Business Machines Corporation, Armonk, N.Y.

[21] Appl. No.: 786,233

[22] Filed: Oct. 31, 1991

[51] Int. Cl.$^6$ .............................................. H04N 7/13
[52] U.S. Cl. .................................... 348/408; 348/416
[58] Field of Search .......................... 395/152; 382/56; 358/136, 433; 364/715.02; 348/407, 408, 409, 415, 416

[56] References Cited

U.S. PATENT DOCUMENTS

| | | | |
|---|---|---|---|
| 4,222,076 | 9/1980 | Knowlton | 358/263 |
| 4,674,125 | 6/1987 | Carlson et al. | 382/49 |
| 4,682,869 | 7/1987 | Itoh et al. | 358/260 |
| 4,709,394 | 11/1987 | Bessler et al. | 382/49 |
| 4,712,140 | 12/1987 | Mintzer et al. | 358/433 |
| 4,718,104 | 1/1988 | Anderson | 382/41 |
| 4,817,182 | 3/1989 | Adelson et al. | 382/56 |
| 4,858,017 | 8/1989 | Torbey | 358/426 |
| 4,858,026 | 8/1989 | Richards | 358/310 |
| 4,868,764 | 9/1989 | Richards | 395/128 |
| 5,031,053 | 7/1991 | Chamzas et al. | 358/433 |
| 5,043,808 | 8/1991 | Knaner et al. | 358/136 |
| 5,048,111 | 9/1991 | Jones et al. | 382/56 |
| 5,050,230 | 9/1991 | Jones et al. | 382/56 |
| 5,060,285 | 10/1991 | Dixit et al. | 358/433 |
| 5,086,487 | 2/1992 | Katayama et al. | 382/56 |
| 5,134,478 | 7/1992 | Golin | 358/136 |
| 5,150,209 | 9/1992 | Baker et al. | 348/407 |
| 5,157,742 | 10/1992 | Niihara | 382/456 |
| 5,166,987 | 11/1992 | Kageyama | 382/56 |
| 5,196,933 | 3/1993 | Henot | 358/136 |
| 5,218,435 | 6/1993 | Lim et al. | 348/409 |
| 5,235,420 | 8/1993 | Charavi | 358/136 |
| 5,241,395 | 8/1993 | Chen | 358/433 |

FOREIGN PATENT DOCUMENTS

| | | |
|---|---|---|
| 2661062 | 4/1990 | France . |
| WO9010353 | 9/1990 | WIPO . |

OTHER PUBLICATIONS

A Two Layer Video Coding Scheme For ATM Networks, Signal Processing Image Communication, vol. 3, (1991) pp. 129–141.

(List continued on next page.)

Primary Examiner—Heather R. Herndon
Assistant Examiner—N. Kenneth Burraston
Attorney, Agent, or Firm—Thomas P. Dowd; Richard M. Ludwin

[57] ABSTRACT

A system and method for processing a stream of video image data so as to create a video representation that multiplexes data corresponding to resolution or bitstream scales. This representation is such that the identity of the basic MacroBlock (MB) structure of the MPEG-1 ISO standard is preserved across all resolution and bitstream scales, e.g. by scaling across four levels of resolution. A MacroBlock is associated with a series of attributes which contribute to the amount of overhead data incorporated in an MPEG-1 compressed data stream, so that by preserving the MacroBlock identify across multiple resolutions and bitstream scales, these scales can share this overhead, thus requiring it to be included only once in the data stream. Preserving the MacroBlock identify also simplifies significantly the derivation of motion estimation vector data for all resolution scales other than the highest resolution. Essentially, the motion vector data corresponding to any resolution scales can be derived from the highest resolution motion vector by appropriately scaling it down. Alternatively, the full resolution motion vectors can be derived by appropriate scale up of lower resolution motion vectors. Further, the methodology for coding a MacroBlock is also preserved.

10 Claims, 11 Drawing Sheets

OTHER PUBLICATIONS

Subband Coding Algorithme For Video Applications: Videophone To HDTV–Conferencing, IEEE Transactions On Circuits & System For Video Technology vol. 1, No. 2, Jun. 1991.

A Pyramid Image Coder Using Classified Transform Vector Quantization, S. H. Park and S. U. Lee, Signal Processing, vol. 22, pp. 25–42, Jan. 1991.

"Alternatives to the Hierarchiral Scheme", Guillemot, C., Nguyen, T. and Legar, A. ISO/JTC1/SC2/WG-8, JPEG N–260 (Feb. 1989).

"Setup of CCIR 601 Multipurpose Coding Scheme", PTT Research, the Netherlands, ISO/IEC JTC1/SC2/WG11 MPEG 91/051 (May 1991).

"Compatible Coding of CCIR 601 Images: Predict the Production Errors", PTT Research, The Netherlands, ISO/IEC JTC1/SC2/WG11 MPEG 91/114 (Aug. 1991).

N = 9    M = 3

N = DISTANCE BETWEEN I-FRAMES

M = DISTANCE BETWEEN P-FRAMES $C_1$ ☐ } 1/64 Resolution

▨ Predicted DCT coefficient
☐ Non-predicted DCT coefficient $C_2$ } 1/16 Resolution $C_4$ } 1/4 Resolution $C_8$ } Full Resolution MCP = Motion Compensated Prediction
IDCT = Inverse Discrete Cosine Transform
$Q_n^{-1}$ = Inverse Quantization at resolution scale n

MOTION VIDEO COMPRESSION SYSTEM WITH MULTIRESOLUTION FEATURES

BACKGROUND OF THE INVENTION

1. Field of the Invention

The present invention relates to the field of data compression and, more particularly, to a system and techniques for compressing and decompressing digital motion video signals at a multiplicity of scales. The techniques expand on algorithms similar to the emerging MPEG standard proposed by the International Standards Organization's Moving Picture Experts Group (MPEG).

2. Environment

Technological advances in digital transmission networks, digital storage media, Very Large Scale Integration devices, and digital processing of video and audio signals are converging to make the transmission and storage of digital video economical in a wide variety of applications. Because the storage and transmission of digital video signals is central to many applications, and because an uncompressed representation of a video signal requires a large amount of storage, the use of digital video compression techniques is vital to this advancing art. In this regard, several international standards for the compression of digital video signals have emerged over the past decade, with more currently under development. These standards apply to algorithms for the transmission and storage of compressed digital video in a variety of applications, including video-telephony and teleconferencing; high quality digital television transmission on coaxial and fiber-optic networks as well as broadcast terrestrially and over direct broadcast satellites; and in interactive multimedia products on CD-ROM, Digital Audio Tape, and Winchester disk drives.

Several of these standards involve algorithms based on a common core of compression techniques, e.g., the CCITT (Consultative Committee on International Telegraphy and Telephony) Recommendation H.120, the CCITT Recommendation H.261, and the ISO/IEC MPEG standard. The MPEG algorithm, has been developed by the Moving Picture Experts Group (MPEG), part of a joint technical committee of the International Standards Organization (ISO) and the International Electrotechnical Commission (IEC). The MPEG committee has been developing a draft standard for the multiplexed, compressed representation of video and associated audio signals. The standard specifies the syntax of the compressed bit stream and a method of decoding a digital video signal at one level of spatial resolution. This draft standard will be referred to as the MPEG-1 standard or algorithm, in order to distinguish it from newer algorithms now under discussion by the same committee. The MPEG-1 draft standard is described in document ISO/IEC JTC1/SC2 WG11 MPEG 91/090 of May 1991.

As the present invention may be applied to extend the functions of an MPEG-1 decoder to produce a multiplicity of video resolutions from the same compressed bit stream, some pertinent aspects of the MPEG-1 video compression algorithm will be reviewed. It is to be noted, however, that the invention can also be applied to other video coding algorithms which share some of the features of the MPEG algorithm.

The MPEG-1 Video Compression Algorithm

To begin with, it will be understood that the compression of any data object, such as a page of text, an image, a segment of speech, or a video sequence, can be thought of as a series of steps, including: 1) a decomposition of that object into a collection of tokens; 2) the representation of those tokens by binary strings which have minimal length in some sense; and 3) the concatenation of the strings in a well-defined order. Steps 2 and 3 are lossless, i.e., the original data is faithfully recoverable upon reversal, and Step 2 is known as entropy coding. (See, e.g., T. BERGER, *Rate Distortion Theory*, Englewood Cliffs, N.J.: Prentice-Hall, 1977; R. McELIECE, *The Theory of Information and Coding*, Reading, Mass.: Addison-Wesley, 1971; D. A. HUFFMAN, "A Method for the Construction of Minimum Redundancy Codes," Proc. IRE, pp. 1098–1101, September 1952; G. G. LANGDON, "An Introduction to Arithmetic Coding," IBM J. Res. Develop., vol. 28, pp. 135–149, March 1984) Step 1 can be either lossless or lossy in general. Most video compression algorithms are lossy. A successful lossy compression algorithm eliminates redundant and irrelevant information, allowing relatively large errors where they are not likely to be visually significant and carefully representing aspects of a sequence to which the human observer is very sensitive. The techniques employed in the MPEG-1 algorithm for Step 1 can be described as predictive/interpolative motion-compensated hybrid DCT/DPCM coding. Huffman coding, also known as variable length coding (see the above cited Huffman 1952 paper) is used in Step 2. Although, as mentioned, the MPEG-1 standard is really a specification of the decoder and the compressed bit stream syntax, the following description of the MPEG-1 specification is, for ease of presentation, primarily from an encoder point of view.

The MPEG-1 video standard specifies a coded representation of video for digital storage media, as set forth in ISO-IEC JTC1/SC2/WG11 MPEG CD-11172, MPEG Committee Draft, 1991. The algorithm is designed to operate on non-interlaced component video, although it can be extended to operate with interlace video by combining two consecutive interlaced fields into a single picture. Each picture has three components: luminance (Y), red color difference ($C_r$), and blue color difference ($C_b$). The $C_r$ and $C_b$ components each have half as many samples as the Y component in both horizontal and vertical directions. Further, the algorithm operates with a single level of video resolution.

Layered Structure of all MPEG-1 Sequence

An MPEG-1 data stream consists of a video stream and an audio stream which are packed, together with systems information and possibly other bitstreams, into a systems data stream that can be regarded as layered. Within the video layer of the MPEG-1 data stream, the compressed data is further layered. The highest layer is the Video Sequence Layer, containing control information and parameters for the entire sequence. A description of the organization of the other layers will aid in understanding the invention. These layers of the MPEG-1 Video Layered Structure, are shown in FIGS. 1–4. Specifically the Figures show:

FIG. 1: Groups of Pictures (GOPs).
FIG. 2: Macroblock (MB) subdivision of a picture.
FIG. 3: Slice subdivision of a picture (example).
FIG. 4: Block subdivision of a macroblock.

The layers pertain to the operation of the compression algorithm as well as the composition of a compressed bit stream. As noted, the highest layer is the Video Sequence Layer, containing control information and parameters for the entire sequence. At the next layer, a sequence is subdivided into sets of consecutive pictures, each known as a Group of Pictures (GOP). A general illustration of this layer is shown in FIG. 1. Decoding may begin at the start of any GOP, essentially independent of the preceding GOPs. There is no limit to the number of pictures which may be in a GOP, nor do there have to be equal numbers of pictures in all GOPs.

The third or Picture layer is a single picture. A general illustration of this layer is shown in FIG. 2. Decoding may begin at the start of any GOP; essentially the luminance component of each picture is subdivided into 16×16 regions and the color difference components are subdivided into 8×8 regions spatially co-sited with the 16×16 luminance regions. Taken together, the co-sited luminance region and color difference regions make up the fifth layer, known as a macroblock (MB).

Between the Picture and MB layers is the fourth or slice layer. Each slice consists of an arbitrary or optional number of consecutive MB's. Slices need not be uniform in size within a picture or from picture to picture. They may be only a few macroblocks in size or extend across multiple rows of MB's as shown in FIG. 3.

An MB is a fundamental layer to which various attributes can be associated as will be seen below. The basic structure of an MB consists of four luminance blocks and two chrominance blocks as seen in FIG. 4. All of these blocks are of size 8×8 in MPEG-1. Preserving the structure and attributes of an MB (not necessarily its size) across a multiplicity of picture resolutions is one of the goals of this invention.

Within a GOP, three types of pictures can appear. The distinguishing difference among the picture types is the compression method used. Intramode pictures or I-pictures are compressed independently of any other picture. Although there is no fixed upper bound on the distance between I-pictures, it is expected that they will be interspersed frequently throughout a sequence to facilitate random access and other special modes of operation. Each GOP must start with an I-picture and additional I-pictures can appear within the GOP. The other types of pictures, predictively motion-compensated pictures (P-pictures) and bidirectionally motion-compensated pictures (B-pictures), will be described in the discussion on motion compensation below. A general illustration is shown in FIG. 5.

Motion Compensation

Most video sequences exhibit a high degree of correlation between consecutive pictures. A useful method to remove this redundancy prior to coding a picture is "motion compensation". Motion compensation requires some means for modeling and estimating the motion in a scene. In MPEG-1, each picture is partitioned into macroblocks and each MB is compared to 16×16 regions in the same general spatial location in a predicting picture or pictures. The region in the predicting picture(s) that best matches the MB in some sense is used as the prediction. The difference between the spatial location of the MB and that of it's predictor is referred to as a motion vector. Thus, the outputs of the motion estimation and compensation for an MB are motion vectors and a motion-compensated difference macroblock. These can generally be compressed more than the original MB itself. Pictures which are predictively motion-compensated using a single predicting picture in the past, i.e., forward-in-time in the sequence, are known as P-pictures.

In MPEG-1, the time interval between a P-picture and its predicting picture can be greater than one picture interval. For pictures that fall between P-pictures or between an I-picture and a P-picture, backward-in-time prediction may be used in addition to forward-in-time prediction. Such pictures are known as bidirectionally motion-compensated pictures (B-pictures). For B-pictures, in addition to forward and backward prediction, interpolative motion compensation is allowed in which the predictor is an average of a block from the previous predicting picture and a block from the future predicting picture. In this case, two motion vectors are needed.

The use of bidirectional motion compensation leads to a two-level motion compensation structure, as depicted in FIG. 5. Each arrow indicates the prediction of the picture touching the arrowhead using the picture touching the clot. Each P-picture is motion-compensated using the previous P-picture (or I-picture, as the case may be). Each B-picture is motion-compensated by the P- or I-pictures immediately before and after it. These predicting pictures are sometimes referred to as "anchor" pictures. No limit is specified in MPEG-1 on the distance between anchor pictures, nor on the distance between I-pictures. In fact, these parameters do not have to be constant over an entire sequence. Referring to the distance between I-pictures as N and to the distance between P-pictures as M, the sequence shown in FIG. 5 has (N,M)=(9,3).

It should therefore be understood that an MPEG-1 sequence consists of a series of I-pictures which may have none or one or more P-pictures sandwiched between them. The various I- and P-pictures may have no B-pictures or one or more B-pictures sandwiched between then, in which latter event they are anchor pictures.

Transformation and quantization of an MB

One very useful image compression technique is transform coding. (See N. S. JAYANT and P. NOLL, Digital Coding of Waveforms, Principles and Applications to Speech and Video, Englewood Cliffs, N.J.: Prentice-Hall, 1984, and A. G. TESCHER, "Transform Image Coding," W. K. Pratt, editor, Image Transmission Techniques, pp. 113-155, New York, N.Y.: Academic Press, 1979.) In MPEG-1 and several other compression standards, the discrete cosine transform (DCT) is the transform of choice. (See K. R. RAO and P. YIP, Discrete Cosine Transform, Algorithms, Advantages, Applications, San Diego, Calif.: Academic Press, 1990, and N. AHMED, T. NATARAJAN, and K. R. RAO, "Discrete Cosine Transform," IEEE Transactions on Computers, pp. 90-93, January 1974.) The compression of an I-picture, for example, is achieved by taking the DCT of the blocks of luminance and chrominance pixels within a MB, quantizing the DCT coefficients, and Huffman coding the result. Similar principles apply to the compression of P- and B-pictures except that, in these cases, the DCT may be applied to the difference between the blocks of pixels within an MB and their corresponding motion-compensated-prediction. The DCT converts a block of n×n pixels into an n×n set of transform coefficients. The DCT is very useful in compression applications, because it lends to concentrate the energy of the block of pixel data into a few of the DCT coefficients, and further, the DCT coefficients are nearly independent of each other. Like several of the international compression standards, the MPEG-1 algorithm uses a DCT block size of 8×8, which corresponds to the size of the blocks within an MB. It is one purpose of this invention to use DCTs of larger and smaller sizes so as to scale the size of an MB thus supporting pictures of multiple resolutions.

The next step is quantization of the DCT coefficients, which is the primary source of lossiness in the MPEG-1 algorithm. Denoting the elements of the two-dimensional array of DCT coefficients by $c_{mn}$, where m and n can range from 0 to 7, aside from truncation or rounding corrections, quantization is achieved by dividing each DCT coefficient $c_{mn}$ by $w_{mn} \times OP$, with $w_{mn}$ being a weighting factor and QP being the quantizer parameter. The weighting factor $w_{mn}$ allows coarser quantization to be applied to the less visually significant coefficients. There can be two sets of these weights, one for I-pictures and the other for P- and B-pictures. Custom weights may be transmitted in the video sequence layer. The quantizer parameter QP is the primary means of trading off quality vs. bit-rate in MPEG-1. It is important to note that QP can vary from MB to MB within a picture. It is also important to note that in this invention it is possible to choose either to provide separate weight matrices for the DCTs of other sizes, or to provide weight matrices of different sizes which are mathematically related so as to facilitate decoder processing.

Following quantization, the DCT coefficient information for each MB is organized and coded, using a set of Huffman codes. The details of this step are not essential to an understanding of the invention so that no description will be given, but for further information thereon reference may be had to the previously-cited HUFFMAN 1952 paper.

Macroblock Attributes due to Motion Compensation

It will be appreciated that there are three kinds of motion compensation which may be applied to MB's: forward, backward, and interpolative. The encoder must select one of these modes. For some MBs, none of the motion compensation modes yields an accurate prediction. In such cases, the MB may be selected for intramode coding as with I-pictures. Thus, depending on the motion compensation mode, MBs can be of the following types:
forward
backward
interpolative
intra Also in P-pictures, depending on the value of the motion vector, MBs can be either of the type with motion vector zero or of the non-zero type. These types together with the required motion vector data are coded with every MB as overhead data. The exceptions are skipped MBs, as will be explained below.

Macroblock Attributes due to Transformation and Quantization

As discussed previously, the QP parameter can be changed on an MB to MB basis. When this change takes place additional MB types are used to indicate that a new QP should be used. The new QP value itself is transmitted together with the MB.

After applying the DCT and quantization to the blocks within an MB, it may result that some of the blocks contain only zeros. These blocks do not require further data to be coded and are signalled by a, so called, coded block pattern code. This code represents additional overhead.

Finally whenever MBs contain no additional new information, they can also be skipped. To convey this information an MB address is also transmitted together with every non-skipped MB.

It should be noted then that MBs carry with them a series of attributes that need to be described by including overhead data with each coded MB. It is one object of this invention to preserve the identity of MBs across a multiplicity of scales such that the overhead is included only once, except perhaps for the refinement of some parameters such as the accuracy of the motion vectors.

THE PROBLEM

It should be understood, therefore, from the foregoing description of the MPEG-1 video algorithm, that the purpose of the MPEG-1 standard is to specify the syntax of a compressed bit stream corresponding to a video sequence, and to specify the methods used to decode the sequence at a single level of spatial resolution. The problem to which the present invention is addressed is extending the specification of the syntax and the decoding methods of MPEG-1 so that digital video sequences can be decoded and encoded at a multiplicity of scales. For present purposes, two styles of scaling are distinguished:

1. Resolution Scaling: This refers to the ability of generating a bitstream that can be decoded at a multiplicity of spatial resolutions by selecting different portions of the bitstream. This feature is desirable in some applications where multiple video windows must be displayed in a full resolution screen. It is also desirable because it permits the implementation of decoders of varying degrees of complexity, such that very simple decoders may be possible that decode only the lower spatial resolutions.

2. Bitstream Scaling: This refers to the ability of generating a bitstream in which some coded bits can be disregarded, and a usable image still results. A resolution scalable algorithm is also a bitstream scalable algorithm; however, bitstream scaling is interpreted in a more narrow sense here. Bitstream scalability is intended to mean decompressing to full resolution always. This is a useful feature for graceful degradation of the quality of decompressed video when some of the compressed bitstream data are corrupted by noise.

The present invention is directed to extending the MPEG-1 decoding methods in order to support these two forms of scalability, by providing a method and apparatus which supports resolution and bitstream scaling by hierarchical coding of the 8×8 DCT components. The method is flexible: one or more of these resolution scales can be stacked up to support many applications. The exact number of hierarchical layers is left to the designer of the encoder or the requirements of the application. In addition, this invention addresses the problem of extending the syntax and methods of MPEG-1 such that the attributes of a macroblock are preserved across the various hierarchical layers.

PRIOR ART

There are innumerable articles in the technical literature on the subject of hierarchical coding techniques, which are relevant to the subject matter of the present invention. Many of these references deal with the subjects of subband coding and pyramid coding. Two recent books that review these subjects are:

"Subband Image Coding," J. W. WOODS, editor, Kluwer Academic Publishers, 1991.

"Digital Image Compression Techniques," M. RABBANI and P. JONES, SPIE Optical Engineering, Bellingham, Wash., USA, 1991.

The following three documents are believed to be the most relevant prior art to this invention:

"Alternative to the hierarchical scheme," Ch. GUILLEMOT, T. N'GUYEN, and A. LEGER, ISO/JTC1/SC2/WG8, JPEG N-260, February 1989.

"Setup of CCIR 601 multi-purpose coding scheme," PTT RESEARCH, the Netherlands, ISO/IEC JTC1/SC2/WG11 MPEG 91/051, May 1991.

"Compatible Coding of CCIR 601 images: Predict the prediction error," PTT RESEARCH, the Netherlands, ISO/IEC JTC1/SC2/WG 11 MPEG 91/114, August 1991.

The first document describes a hierarchical scheme for compressing multiresolution still images, in which the DCT coefficients of the lower resolution images are used to predict the higher resolution DCT coefficients. This scheme differs from this invention in that DCTs are always of the same size. In addition, there is no consideration of applying the scheme to compressing video segmented into blocks of pixels with common attributes.

The second, and particularly the third, document describe a scheme that resembles the present invention when applied to two layers of resolution. The purpose of the scheme in these teachings is to utilize two levels of resolution scale such that pictures compatible with the CCIR 601 format as well as the MPEG-1 SIF format are generated. There is no attempt to generalize further the technique for a coder that is scalable in resolution and bitstream. Furthermore, the attributes of a Macroblock are not preserved across the two scale levels, specifically motion compensation vectors at the higher resolution scale are specified at the 16×8 block level rather than the 32×16 CCIR 601 Macroblock level. This means that this attribute cannot be shared by the resolution scales. Also, no details are provided on how other attributes are handled.

OBJECTS

In contrast to the foregoing prior art systems and algorithms, it is an object of the present invention to provide a flexible syntax and encoding/decoding architecture for compressing video sequences, which permit the decoding of video at a multiplicity of spatial resolution and bitstream scales.

It is another object of the present invention to provide a system and algorithms for supporting a multiplicity of scales in a way that extends the existing syntax and methods of the MPEG-1 standard. Such extensions are performed with a minimum of additional overhead information.

It is a further object of the present invention to provide encoder and decoder implementations in keeping with the system and algorithms of the invention.

SUMMARY OF THE INVENTION

The present invention involves a system and methods for processing a stream of video image data in such manner as to create a representation for video data that multiplexes data corresponding to resolution or bitstream scales. This representation is such that the identity of the basic MacroBlock (MB) structure of MPEG-1 is preserved across all resolution and bitstream scales. FIG. 6 shows how the MB identity is preserved by scaling across four levels of resolution. It is important to preserve this identity because an MB is associated with a series of attributes which contribute to the amount of overhead data incorporated in an MPEG-1 compressed data stream. By preserving the MB identity across multiple resolutions and bitstream scales, these scales can share this overhead, thus requiring it to be included only once in the data stream.

Preserving the MB identity also simplifies significantly the derivation of motion estimation vector data for all resolution scales other than the highest resolution. Essentially the motion vector data corresponding to any resolution scale can be derived from the highest resolution motion vector data by appropriately scaling it down. For example, the x- and y-motion-vector components at $\frac{1}{4}$ resolution are $\frac{1}{2}$ the corresponding full resolution components. Alternatively, the full resolution motion vectors can be derived by appropriate scale up of lower resolution motion vectors. In the latter case, an additional correction may be added at the higher resolution scale to improve the precision of the motion vector data.

A second aspect of this invention is that the methodology for coding an MB is also preserved. As noted above, in MPEG-1 an MB is subdivided into six 8×8 blocks of luminance and chrominance information, each block being coded using the 8×8 Discrete Cosine Transform (DCT). In the present technique, each scaled MB is also divided into six sub-blocks of luminance and chrominance information, each sub-block being coded using a DCT of appropriate size. Thus for the $\frac{1}{4}$ resolution MB in FIG. 6, a DCT of size 4×4 would be used. Incidentally, it should be noted that such 4×4 DCT, for example, can be derived from the corresponding 8×8 DCT coefficients in a variety of ways, such that no explicit implementation of a 4×4 DCT is required.

Finally, a third aspect of this invention is related to the methodology for generating the DCT block data needed for reconstructing a picture at a target resolution scale. In the inventive technique, the DCT coefficient data at any resolution or bitstream scale are coded by standard differential coding techniques using the DCT data of a hierarchically lower scale as predictors.

BRIEF DESCRIPTION OF THE DRAWINGS

FIG. 1 depicts the Groups of Frames or Pictures (GOP's) FIG. 2 depicts the Macroblock (MB) subdivision of a picture, FIG. 3 depicts an exemplary Slice subdivision of a frame, and FIG. 4 depicts the Block subdivision of a Macroblock.

DETAILED DESCRIPTION OF THE PREFERRED EMBODIMENTS

Figure 1:
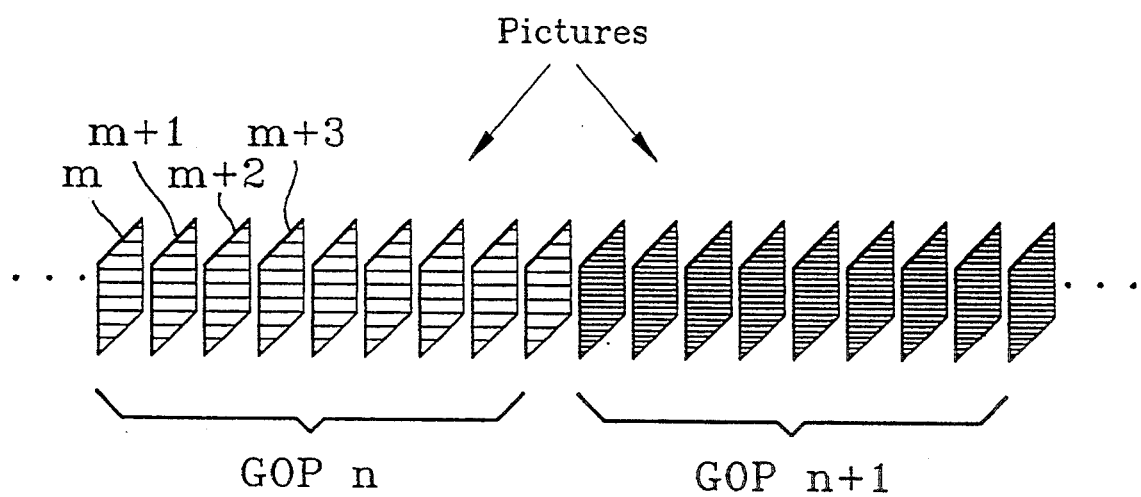
FIGS. 1–4 illustrate layers of compressed data within the video compression layer of the MPEG-1 data stream, i.e.
Figure 2:
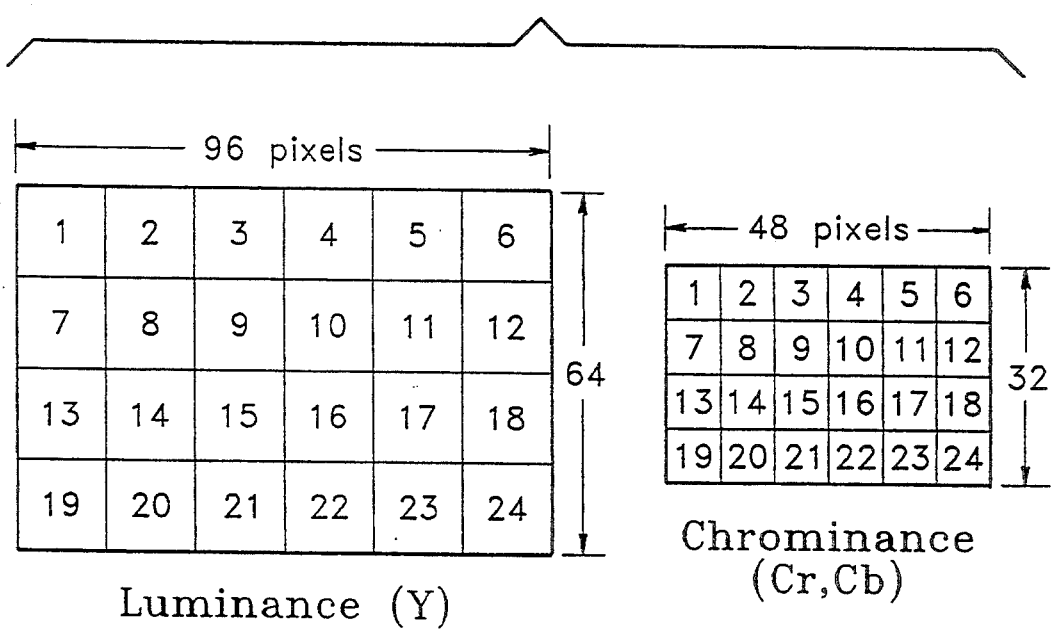
Figure 3:
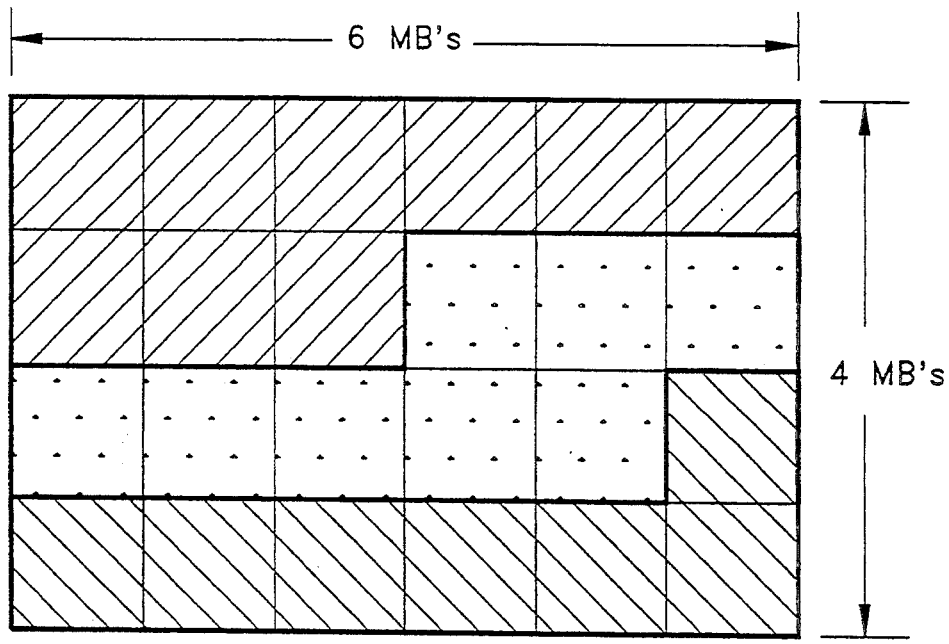
Figure 4:
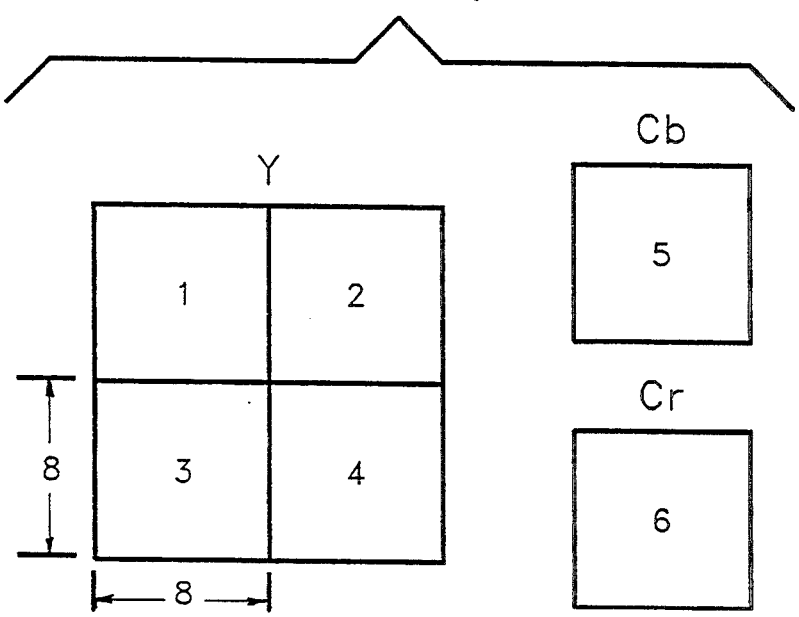
Figure 5:
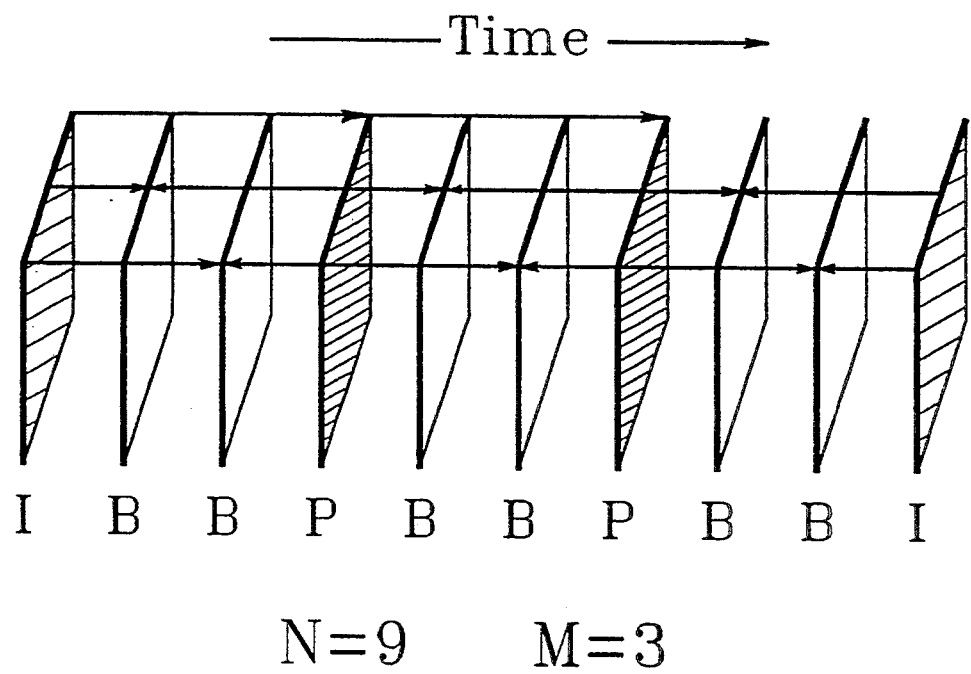
FIG. 5 illustrates the two-level motion compensation among pictures in a GOP employed in the MPEG-1 standard.

Before presenting a description of the particular implementations of the present invention, it should be explained that the wide range of applications in which digital video is expected to play a role, imposes many conflicting requirements for video compression algorithms. These conflicts are manifested in terms of standards compatibility, encoder and decoder implementation complexity, functionality, image quality, etc. It is believed that these conflicting requirements cannot be satisfied by a single coding algorithm, but instead require a flexible architecture of algorithms which can be matched to the requirements of the specific application. Such flexibility may be used to satisfy many of these conflicting requirements, while still preserving a great deal of compatibility amongst the different manifestations of the architecture. It is believed, for example, that while different encoder implementations may be needed for different applications, it should be possible to implement a single decoding device which can decode all bitstreams that conform to the flexible architecture. It is also believed that such a generic decoder should not be excessively complex. One object of this invention is to provide such a generic decoder.

Several applications will benefit from resolution and bitstream scalability features as described above. The methods and apparatus of the invention support resolution and bitstream scaling by hierarchical coding of 8×8 DCT components. Although DCTs of other sizes could be used, the preferred embodiment starts with 8×8 DCTs because that is the choice of several standard compression algorithms.

For resolution scaling, the invention may be used to provide, for example, up to four levels of resolution. The lowest possible resolution is attained by coding the equivalent of the upper left component of an 8×8 DCT block; this resolution is 1/64 of the original resolution. Next a resolution of 1/16 of the original resolution may be obtained by coding of the equivalent of the upper left 2×2 coefficients of the DCT block. Coding of the equivalent of the upper left 4×4 coefficients leads to a resolution of ¼ of the original resolution. Finally, the coding of all 8×8 coefficients leads to the full resolution video.

Given a fixed resolution, the invention supports bitstream scaling by coding multiple hierarchical layers at the same resolution. But, with progressively finer quantization factors, these layers would result in video of the same spatial resolution and of incresing quality.

In this case, the first and lowest layer of the hierarchy is coded with coarse quantization and the higher layers are coded with quantization of increased precision.

The architecture is flexible: one or more of these hierarchical layers can be stacked up in order of increasing resolution or precision, such that the reconstructed coefficients at one level of resolution are used to predict the corresponding coefficients at the next level of resolution. Except for the lowest hierarchical layer, transform coefficients in any layer are coded differentially with respect to their prediction. An encoder might be chosen, for example, to generate a bitstream that only contains data for the full and the 1/16 resolution scales. In such case, the coefficients at the 1/16 resolution layer would be used to predict the coefficients at the full resolution layer. Alternatively, for bitstream scalability, a coarsely quantized set of 8×8 DCT coefficients in one layer can serve as prediction for the corresponding set of 8×8 coefficients in the next layer, which are more finely quantized.

Figure 6:
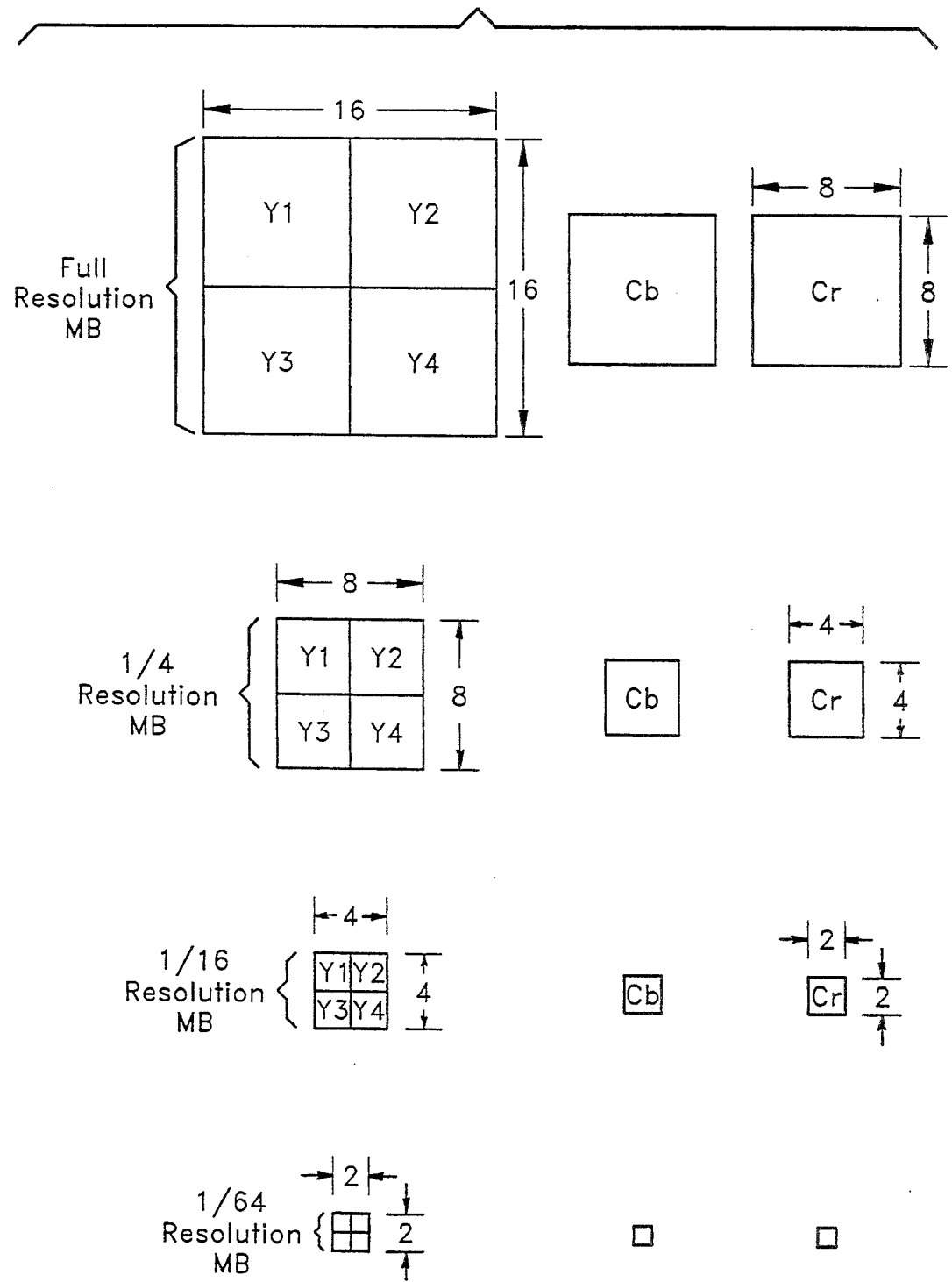
FIG. 6 illustrates how macroblocks are scaled at various resolution scales according to the present invention. Note that macroblocks can also be scaled to resolutions higher than the full resolution shown in the Figure.

The basic characteristic of the architecture of the invention is that the identity of the MacroBlock (MB) structure of MPEG-1 is preserved across all resolution and precision layers. FIG. 6 shows this feature for the case of coding with four levels of resolution. It is important to preserve this identity because, as noted in the description of the MPEG-1 algorithm, an MB is associated with a series of attributes which contribute to the amount of overhead data incorporated in a compressed data stream. Preserving the MB identity permits the reuse of this overhead data for all hierarchical layers. For example, the motion vector data corresponding to any resolution scale can be derived from the highest resolution motion vector data by appropriate scaling.

Multiplexing of scaling layers

Although not the subject of this invention, it is important to note that, before transmission or storage, the data for the various scales must be multiplexed by an encoding device. There are many options for implementing this multiplexing. For example, the data for a full picture at each level of hierarchy could be catenated in the order of increased resolution and precision. It will be understood that the data contains signals representative of information related to the picture elements or pixels of the video images being handled. These signals are typically electrical signals that are processed in appropriate electronic devices, such as video cameras, computers, and ancilliary equipment as will be thoroughly familiar to and understood by those of skill in the art.

Quantization of resolution and bitstream scales

In the preferred embodiment, the quantization of each hierarchical layer uses the same matrices specified in MPEG-1. Thus, the DCT data for the various resolution scales is derived from the full resolution 8×8 DCT matrix. If the MPEG-1 quantization matrix of weights is denoted by Q8, the matrix of weights for lower resolution DCTs are derived as follows:

| Quantizer | DCT | Factor |
|---|---|---|
| Q1 | 1 × 1 | ⅛ Q8 |

-continued

| Quantizer | DCT | Factor |
| --- | --- | --- |
| Q2 | 2 × 2 | ¼ Q8 |
| Q4 | 4 × 4 | ½ Q8 |

It should be noted that the present invention also covers the case where generic quantization matrices are used at each scale, but this only makes the decoding device more complex.

Hierachical prediction of resolution ion and bitstream scales

Figure 7:
FIG. 7 illustrates the hierarchical prediction of DCT coefficients corresponding to the scales shown in FIG. 6.
Figure 7:
Figure 7:
Figure 7:
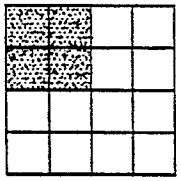
Figure 7:
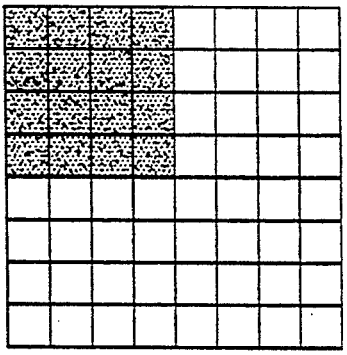

In the preferred embodiment, DCT coefficients in a hierarchical layer are used to predict the corresponding coefficients in the next layer of the hierarchy. An example is illustrated in FIG. 7 wherein a hierarchy of 4 resolution layers is shown. The prediction algorithm is a simple one-to-one mapping of the properly scaled coefficients. However, it should be noted that other prediction algorithms could be used again at the cost of increased complexity.

Provisions for rate control of hierarchical layers

In the preferred embodiment the quantization parameter of MPEG-1, QP, is used at the lowest layer of the hierarchy. QP parameters at other layers of the hierarchy are specified with reference to this lower layer QP. For example, a high layer QP parameter could be specified to be twice the lower layer QP.

Scalable decoder implementations

Figure 8:
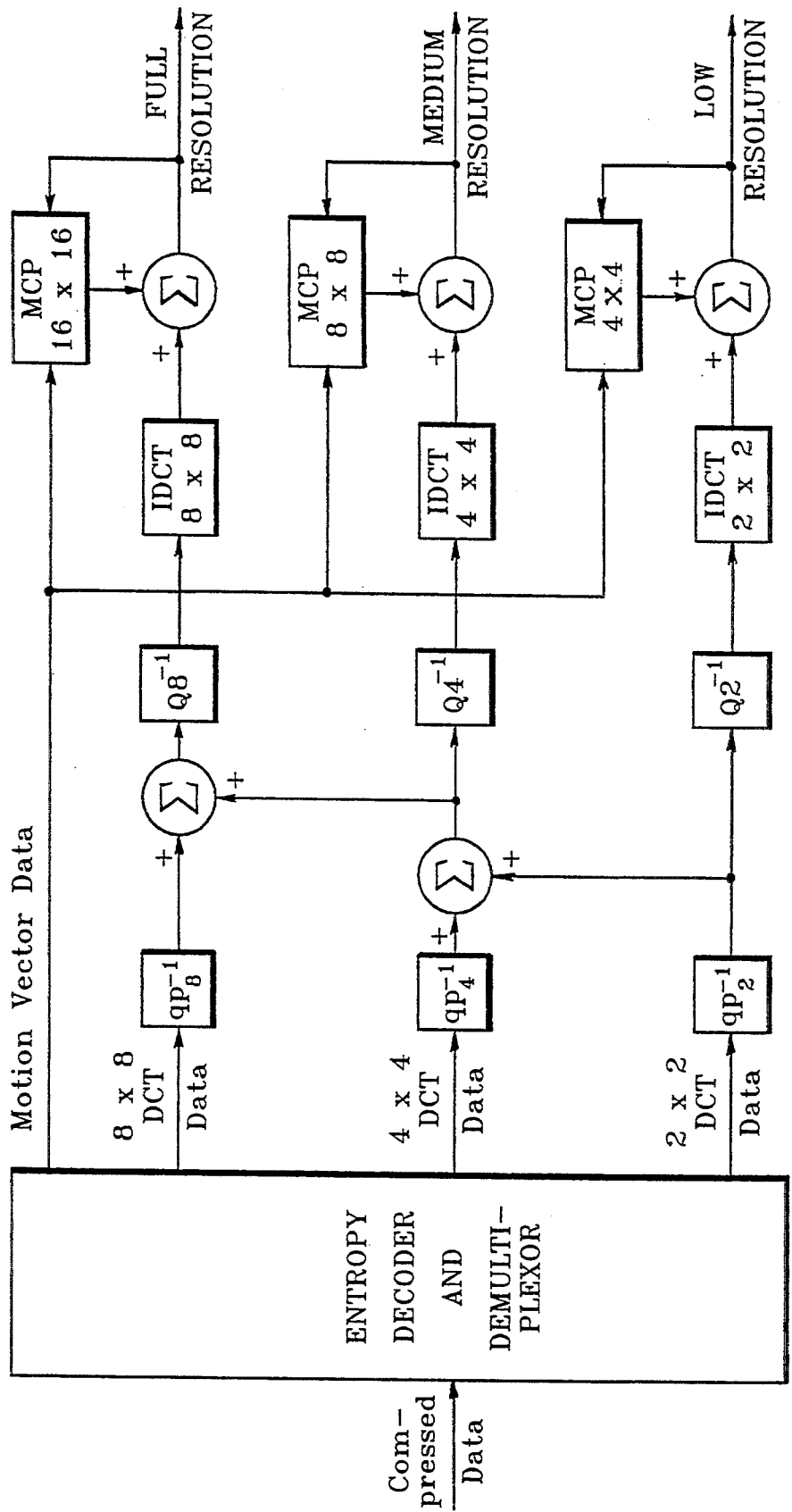
FIG. 8 is a block diagram of a decoder that can decode three of the four resolution scales of FIGS. 6 and 7. Note that several of the blocks could be discarded if only one resolution scale is desired as an output.

The invention involves an architecture with a flexible number of hierarchical layers. However, for ease of explanation, two three-layer decoders that exemplify the resolution anti bitstream scalability features will be described. The decoder apparatus, which is shown in FIG. 8, supports 2×2 (low), 4×4 (medium), and 8×8 (high) resolution scales. Decoders with only one target resolution scale can be implemented by eliminating the boxes in FIG. 8 that are not necessary to achieve the target. After entropy decoding and demultiplexing the compressed data for the three resolution scales, there will be for every 8×8 block data, corresponding 2×2 and 4×4 block data, all of which are necessary to build the final 8×8 matrix of DCT coefficients.

In the preferred embodiment, the following steps are followed to arrive at the full resolution 8×8 DCT coefficients. After dequantizing by the $qp_2$ quantization parameter of the 2×2 layer, the low resolution 2×2 blocks are used as a prediction to the four lowest order coefficients of the corresponding 4×4 blocks. These predictions are summed to the dequantized 4×4 coefficients, where dequatization of the 4×4 coefficients is performed by the $qp_4$ quantization parameter. The results of the previous sum are similarly used as prediction to the 16 lowest order coefficients of the corresponding 8×8 blocks. These predictions are summed to the dequantized 8×8 coefficients, where dequantization of the 8×8 coefficients is performed by the $qp_8$ quantization parameter.

Note that the DCT coefficients are only dequantized by quantization parameters as the final matrix of coefficients is rebuilt. Dequantization by the quantization matrix of weights is only needed once the final resolution is reached. This feature is possible because, in the preferred embodiment, the matrix of weights at the various scales are proportionally related as explained above.

The final 8×8 matrix of coefficients can now be used to reconstruct the full resolution picture using MPEG-1 techniques, including motion compensated prediction. Referring to FIG. 8 in this regard, it will be appreciated that at the full resolution level the 16×16 MCP unit represents a generic MPEG-1 Motion Compensation Prediction unit operating on an MB; the IDCT box is a unit for performing a standard MPEG-1 8×8 inverse transformation; and the $Q8^{-1}$ box represents a unit for performing inverse quantization by the corresponding MPEG-1 matrix of weights.

To decode video pictures at other resolution scales a similar procedure is followed, except that the process of summing predictions to dequantized coefficient data stops at the resolution at which it is desired to decode. The operation of dequantization by a matrix of weights, represented by $Q4^{-1}$, and $Q2^{-1}$, uses the scaled matrices of the preferred embodiment. The operation of inverse transformation is performed by using a transform of the appropriate size. Thus for decoding at ¼ resolution a 4×4 inverse DCT should be used. The one-dimensional DCT matrices appropriate for decoding at the three "scaled" resolutions supported are:

$$DCT(1 \times 1) = 1$$

$$DCT(2 \times 2) = \frac{1}{\sqrt{2}} \begin{bmatrix} 1 & 1 \\ 1 & -1 \end{bmatrix}$$

$$DCT(4 \times 4) = \frac{1}{2} \begin{bmatrix} 1.00 & 1.31 & 1.00 & 0.54 \\ 1.00 & 0.54 & -1.00 & -1.31 \\ 1.00 & -0.54 & -1.00 & 1.31 \\ 1.00 & -1.31 & 1.00 & -0.54 \end{bmatrix}$$

Both the DCT(1×1) and the DCT(2×2) are trivial and should be easy to implement, even in software.

It should be noted that MCP units at other resolutions share the same motion vector data, MV, to generate motion compensated predictions for the scaled MBs at the various resolution scales. Of special note is that when using motion compensation techniques, the full resolution motion vector should be scaled appropriately to match the decoder resolution. This has been described previously.

Figure 9:
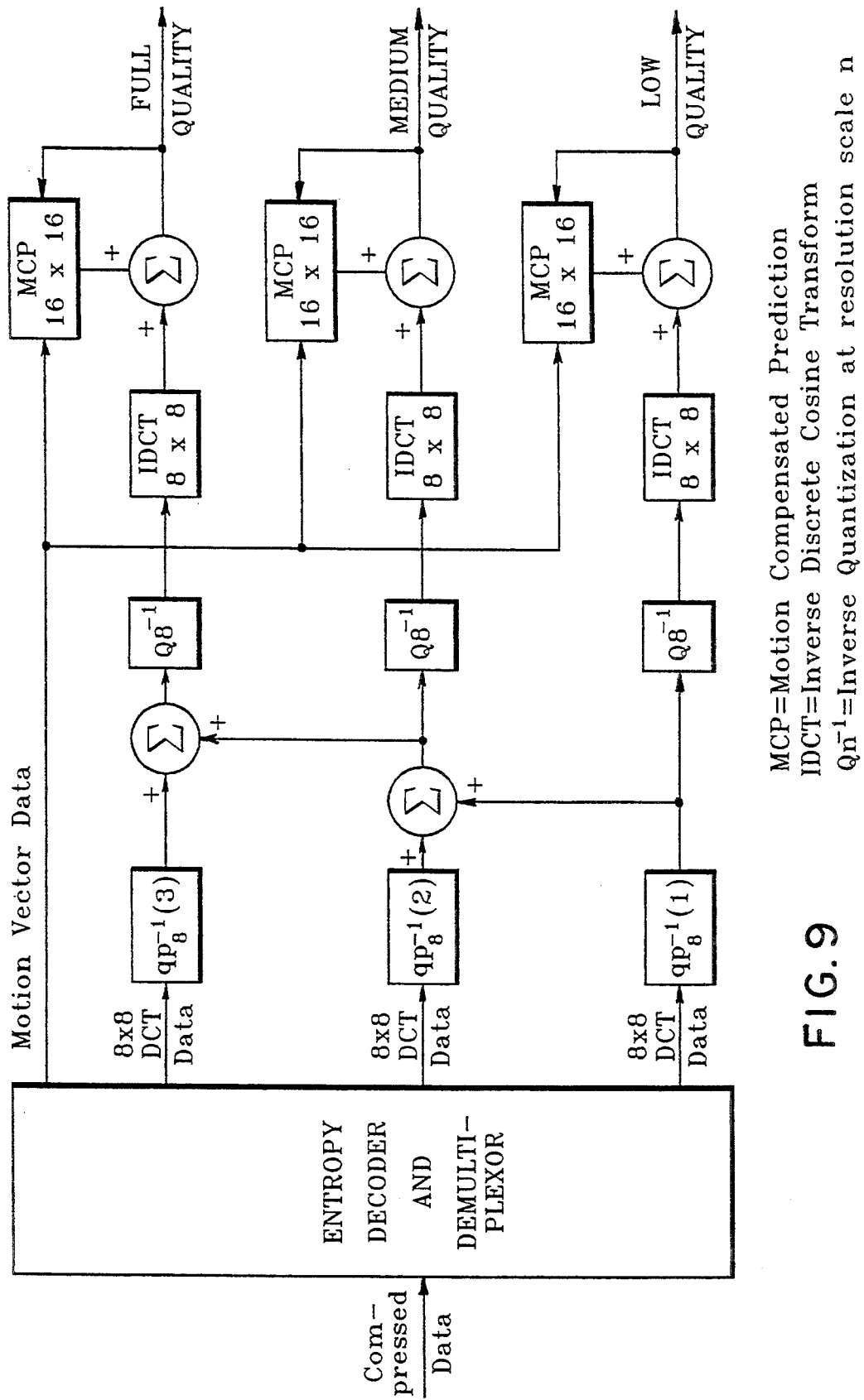
FIG. 9 is a block diagram of a decoder with bitstream scalability.

A decoder that implements bitstream scalability is shown in FIG. 9. The operation of this decoder is very similar to that of FIG. 8, except that only 8×8 operations are used to produce output pictures of increasing levels of quality. For this reason the various units (e.g., $Q8^{-1}$, IDCTs, and MCP, etc), can be physically implemented by single hardware and shared by the various hierarchical layers.

Figure 10:
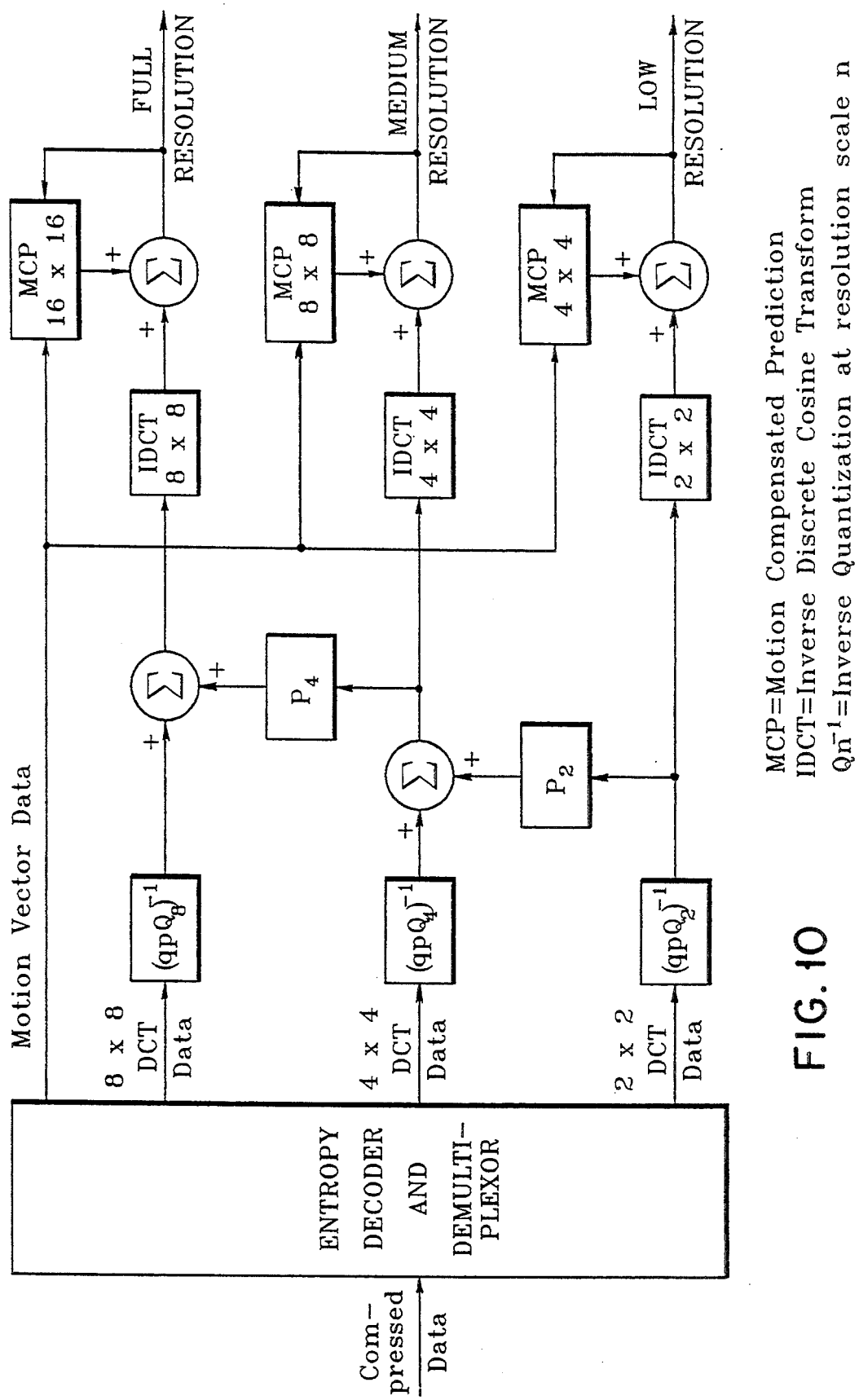
FIG. 10 is a block diagram of an hierarchical decoder with dequantization prior to prediction.

Finally, an alternative decoder implementation that is not part of the preferred embodiment, but in keeping with the invention, is shown in FIG. 10. This decoder operates in the same manner as that in FIG. 8. However, it permits any quantization weight matrices to be used in the various hierarchical layers. It also implements generic means of predicting DCT coefficients from a lower hierarchical layer. In this sense P2 is used to predict 4×4 coefficients from 2×2 coefficients, and P4 is used to predict 8×8 coefficients from 4×4 coefficients. There are many prediction algorithms that may be used, including the one-to-one mapping of the preferred embodiment.

Encoder implementations

Figure 11:
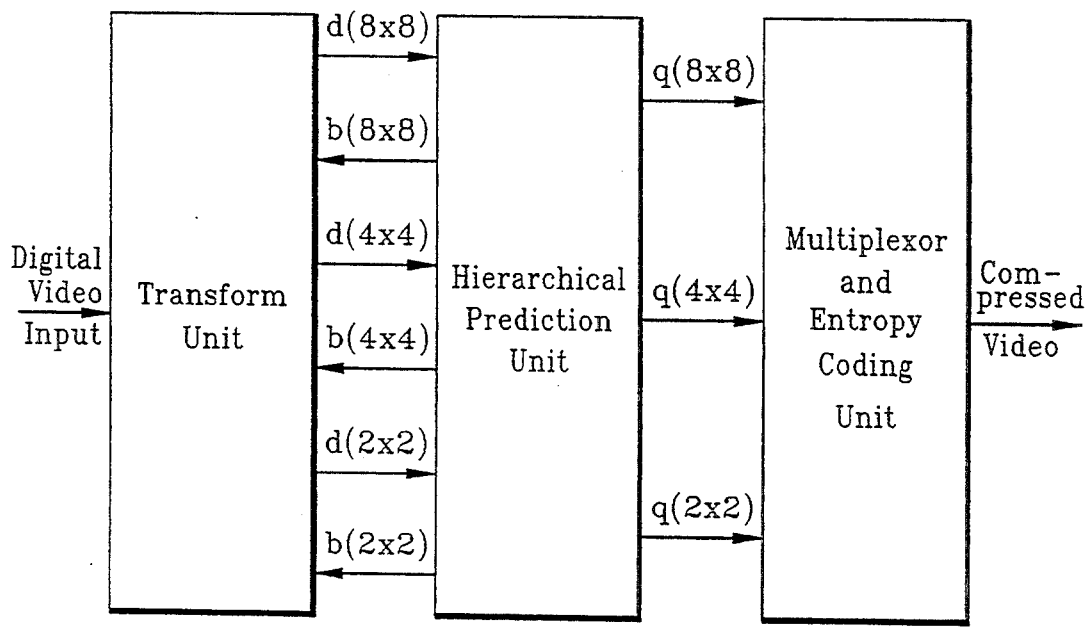
FIG. 11 is a block diagram of a flexible scalable video compression encoder implementation that can be used with the present invention.

There are many possible implementations of encoders compatible with the decoders of the present invention described above, however, by way of example, two such encoders, each of which is only designed for resolution scaling, will be described. The general structure of a three resolution layer encoder is shown in FIG. 11. The encoder is divided into three parts. The first part is a transform unit which takes the digital video input and outputs DCT data for the three resolution layers: $d(8\times 8)$, $d(4\times 4)$, and $d(2\times 2)$. The second part is an hierarchical prediction unit which takes the tranform unit's DCT output, and outputs quantized differential DCT data at all resolution layers: $q(8\times 8)$, $q(4\times 4)$, and $q(2\times 2)$. This output is multiplexed and entropy coded in the third unit to generate the final compressed video. The prediction unit also generates reconstructed DCT data: $b(8\times 8)$, $b(4\times 4)$, and $b(2\times 2)$, which is fed back to the transform unit to complete the loop of typical hybrid transform codes.

Figure 12A:
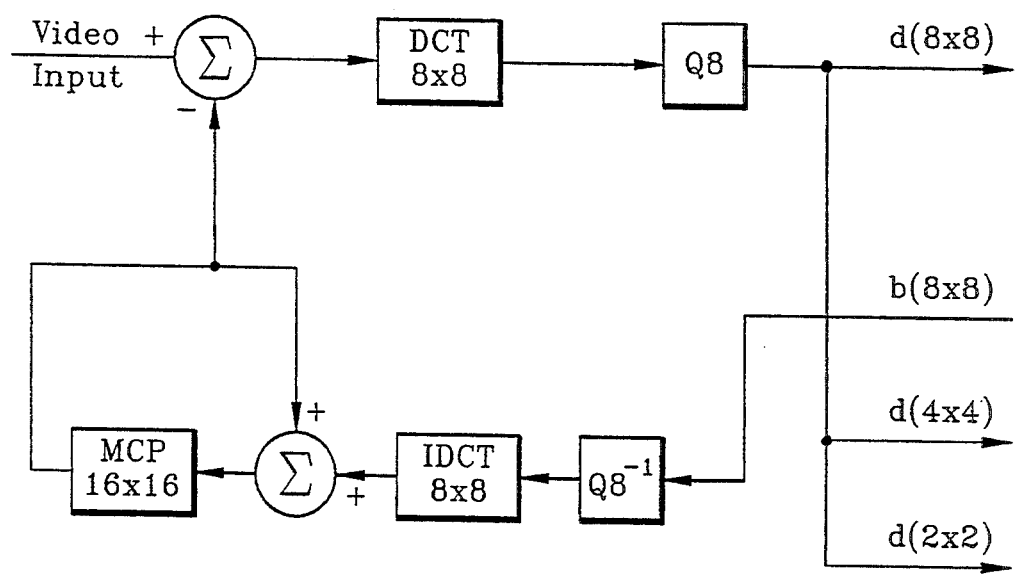
FIG. 12a is a block diagram of one version of Transform Unit that can be used in the flexible scalable video compression encoder implementation of FIG. 11.

FIG. 12a shows a simple implementation of the transform unit. In this implementation the $8\times 8$ layer contains elements which are also part of MPEG-1 encoders and more generically, part of motion compensated hybrid transform encoders. The upper branch contains: a summer ($\Sigma$) to generate a motion compensated prediction difference; a forward $8\times 8$ DCT transform to generate the $8\times 8$ transform coefficients of said prediction difference; and a unit for quantization by a matrix of weights (Q8). The output is a set of partially quantized DCT coefficients, $d(8\times 8)$. The return or feedback branch receives a set of partially reconstructed DCT coefficients, $b(8\times 8)$, and then processes them with the following units: an inverse quantizer for the matrix of weights ($Q8^{-1}$) and inverse DCT transformer (IDCT $8\times 8$) that reconstructs the prediction differences; a summer to add the reconstructed prediction differences to the motion compensated prediction thus reconstructing the original picture data; and finally, a Motion Compensation Prediction (MCP) unit to generate a prediction for the next picture. In MPEG-1 this MCP unit operates on $16\times 16$ MBs as shown in the Figure, but other block sizes could be used. In this implementation of the transform unit, the $d(2\times 2)$ and $d(4\times 4)$ coefficients are simply extracted from the corresponding $8\times 8$ coefficients. It should be noted that it is also possible to derive the $d(2\times 2)$ and $d(4\times 4)$ coefficients through other reduction or weighting algorithms applied to the $8\times 8$ coefficients.

Note that because there is no feedback loop in the lower resolution scales, this encoder will result in accumulation of quantization and motion compensation errors at these resolution scales. The error, however, will be naturally reset back to zero whenever a new Group of Pictures starts. While the quality of the lower resolution layers will be limited by this accumulation of errors, the simplicity of the encoder makes this approach attractive. In particular, if what is required is only bitstream scalability, this approach is all that is needed.

Figure 12B:
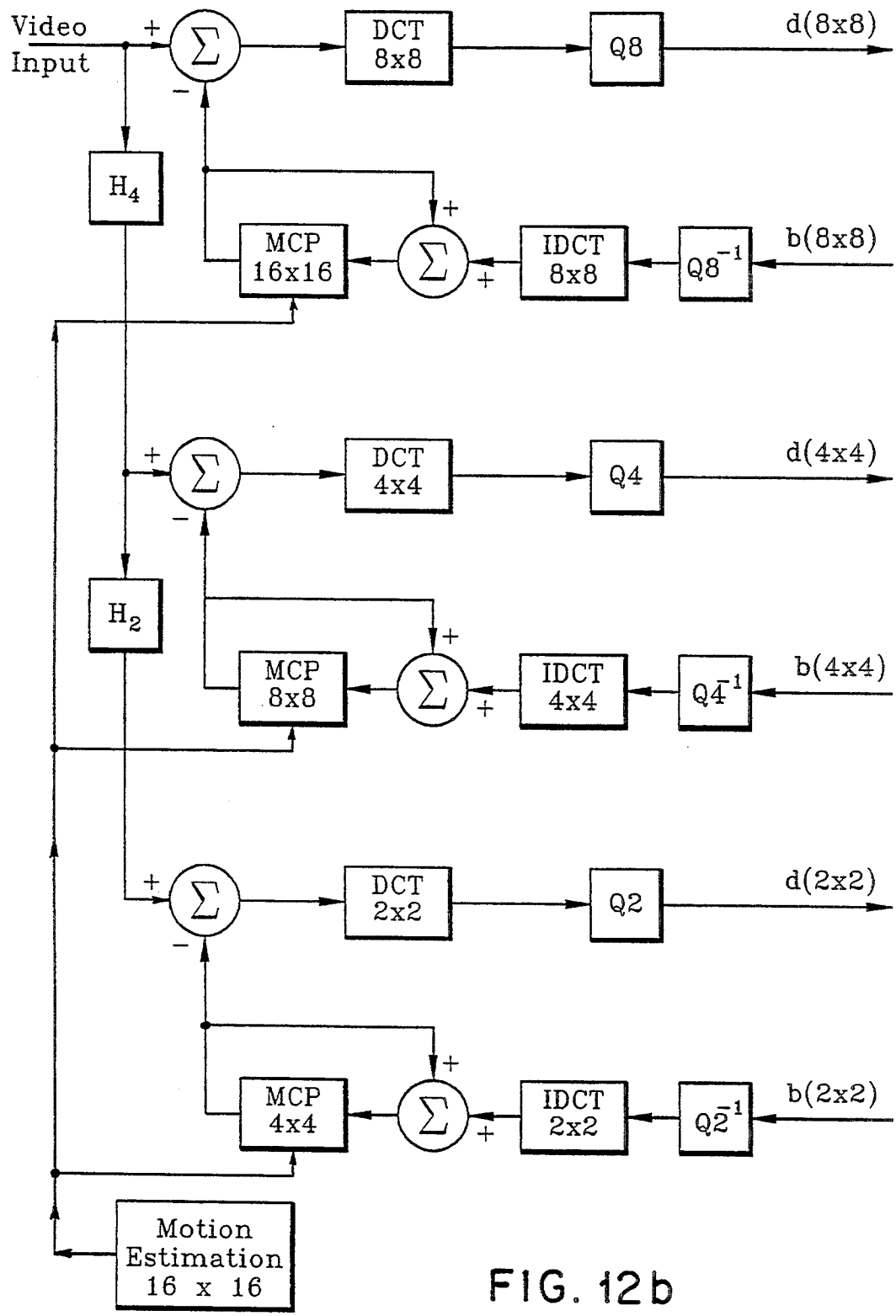
FIG. 12b is a block diagram of another version of Transform Unit that can be used in the flexible scalable video compression encoder implementation of FIG. 11.

Another implementation of the transform unit is shown in FIG. 12b. This version is similar to the one in FIG. 12a, however, $d(2\times 2)$ and $d(4\times 4)$ are generated by similar, but completely independent loops operating at each resolution scale. In this sense, the $H_4$ and $H_2$ refits are used to filter and reduce the resolution of the input video by a factor of ¼ in each case. In this manner each layer takes an input of the appropriate resolution. All operations such as DCT, quantization, and MCP are also scaled according to the resolution of the layer.

At a cost of increased complexity, this version would generally produce better quality low-resolution pictures than those produced by the unit in FIG. 12a. In this case, coding errors will not accumulate more than one picture period. Note, however, that the results of the $16\times 16$ motion estimation can be shared by all resolution loops since, in the invention, motion vectors are one of the attributes shared by MBs at all scales. This implementation is more appropriate for applications where the quality of the low resolution video is important.

Figure 13A:
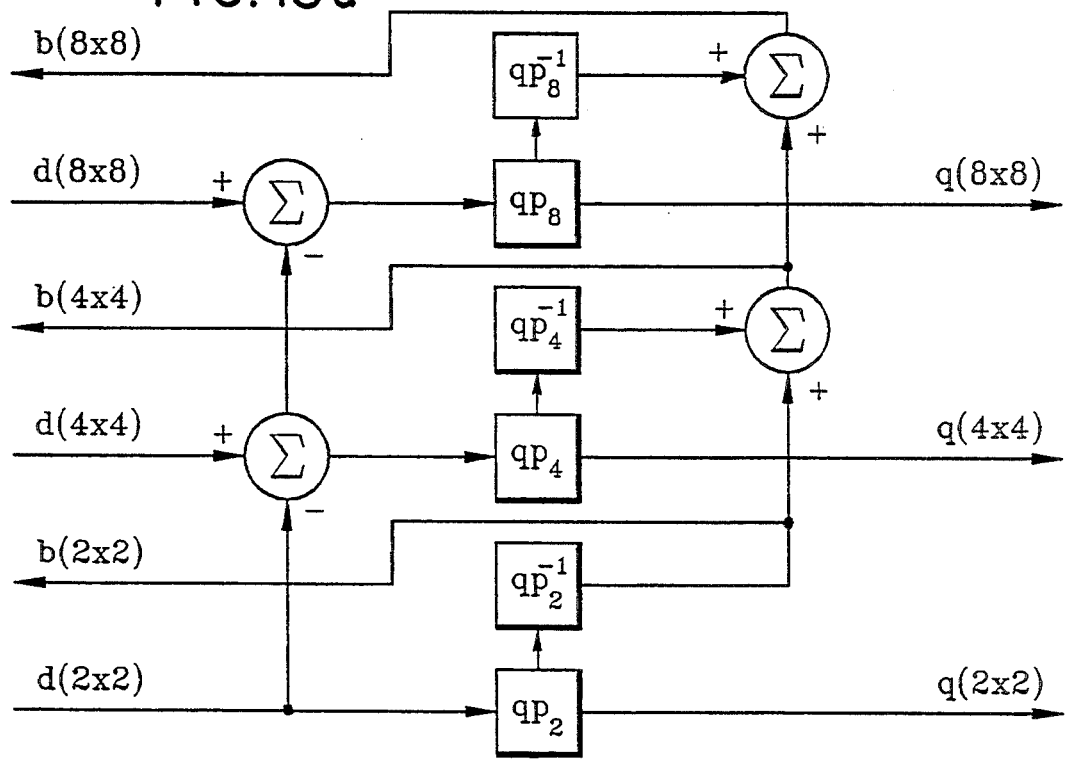
FIG. 13a is a block diagram of one version of a Hierarchical Prediction Unit that can be used in the flexible scalable video compression encoder implementation of FIG. 11.
Figure 13B:
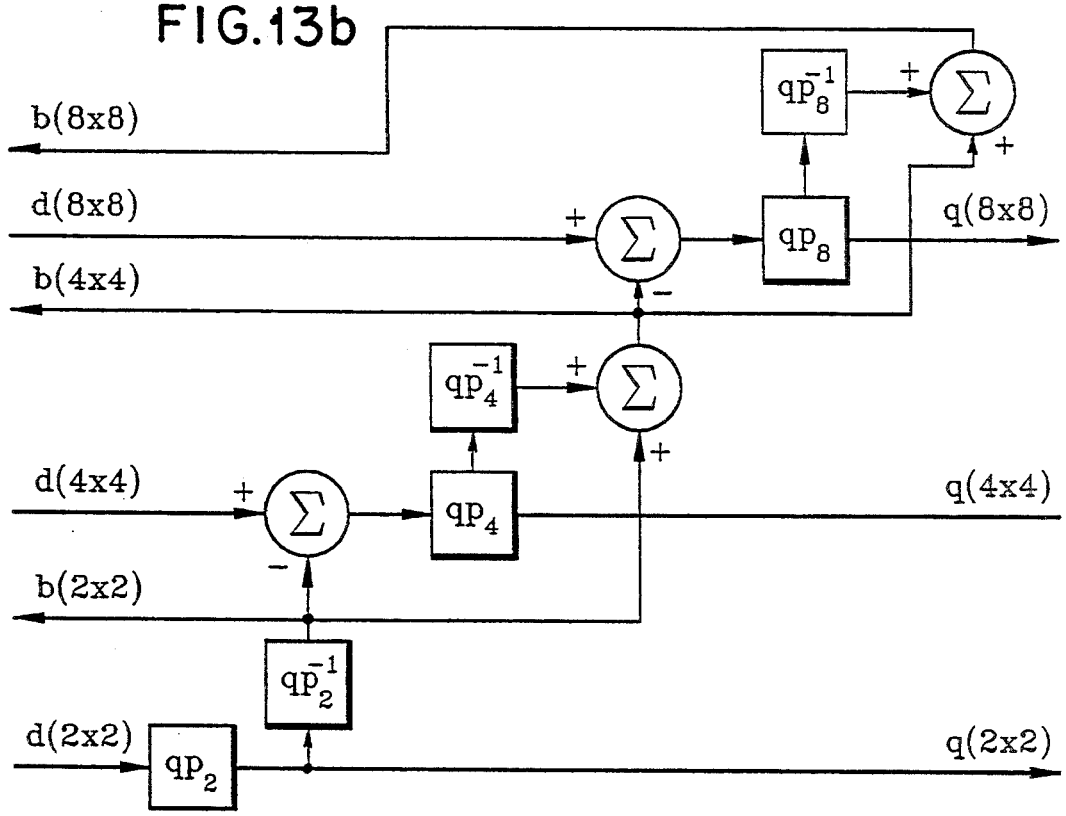
FIG. 13b is a block diagram of another version of a Hierarchical Prediction Unit that can be used in the flexible scalable video compression encoder implementation of FIG. 11.

FIG. 13a shows one implementation of the hierarchical prediction unit. First the hierarchical prediction differences for the $4\times 4$ and $8\times 8$ layers are generated in the summers. All layers are then quantized by their respective quantizer parameters and the results are output as $q(2\times 2)$, $q(4\times 4)$, and $q(8\times 8)$. These results are also inverse quantized by the corresponding quantizer parameters and then added in the two other summers to generate the partially reconstructed $b(2\times 2)$, $b(4\times 4)$, and $b(8\times 8)$ data, which is fed back to the transform unit. FIG. 13b shows a rearrangement of the same elements which can be used as an alternative implementation for the hierarchical prediction unit.

It should be noted that one skilled in the art can design further encoding alternatives that are compatible with the decoding methodology and architecture of the present invention.

We claim:

1. A method of decoding a moving image at a target spatial resolution scale from compressed video information containing data for a hierarchy of spatial resolution scales, comprising the steps of:
   (a) decompressing macroblock attributes and transform coefficient data from a base spatial resolution scale;
   (b) decompressing refinements to the macroblock attributes and additional transform coefficient data for the next higher spatial resolution scale in the hierarchy;
   (c) repeating step (b) for progressively higher spatial resolution scales in the hierarchy until the target spatial resolution scale is reached; and,
   (d) combining the transform coefficient data which have been decompressed to produce a transform representation of the moving image.

2. A method as in claim 1 wherein said macroblock attributes are appropriately modifiable to conform to the spatial resolution scale of said target spatial resolution scale.

3. A method as in claim 1 further comprising the step of omitting at least a portion of the compressed under information in the macroblock when found in error.

4. A method of producing a compressed video data representation of a moving image, the representation including a hierarchy of picture spatial resolution scales, comprising the steps of:
   providing compressed video data representative of the moving image for a base spatial resolution scale, the data comprising macroblock attributes common to the hierarchy and associated base resolution transform data;
   providing additional data for at least one higher spatial resolution scale, the additional data including associated higher resolution transform data;
   wherein the transform data for each spatial resolution scale in the hierarchy is used to predictably generate the higher resolution transform data for the next higher spatial resolution scale in the hierarchy.

5. The method of claim 4 wherein the additional data for higher spatial resolution scales includes refinements of the macroblock attributes at the base resolution scale.

6. A method of producing a compressed video data representation of a moving image, the representation including a hierarchy of picture quality scales at the same spatial resolution, comprising the steps of:
providing compressed video data representative of the moving image for a base picture quality scale, the data comprising macroblock attributes and associated base bitstream transform data; and,
providing additional data for at least one higher picture quality scale, the additional data including refinement data to increase the precision of the transform data;
wherein the transform data for each picture quality scale in the hierarchy is used to predictably generate higher precision transform data for the next picture quality scale in the hierarchy.

7. The method of claim 6 comprising the further steps of:
providing base data for a base resolution scale, the base data comprising the macroblock attributes and associated base resolution transform data;
providing higher resolution scale data for at least one additional higher resolution scale, the higher resolution scale data including refinements of the macroblock attributes at the base resolution scale and associated higher resolution transform data;
wherein the base resolution transform data is used to predictably generate the higher resolution transform data.

8. The method of claim 6 wherein the additional data for higher precision picture quality scales includes refines of the macroblock attributes at the base picture quality scale.

9. A method of producing a compressed video data representation of a moving image, the representation including a hierarchy of spatial resolution scales, comprising the steps of:
providing compressed video data representative of the moving image for a base spatial resolution scale, the compressed video data comprising macroblock attributes common to the hierarchy and associated base resolution transform data; and,
starting with the base spatial resolution scale, using the transform data for each of the spatial resolution scales to predictably generate higher resolution transform data for a next higher spatial resolution scale until the transform data has been generated for each spatial resolution scale in the hierarchy.

10. A method of decoding a moving image at a target quality level scale from compressed video information containing data for a hierarchy of quality level scales, comprising the steps of:
(a) decompressing macroblock attributes and transform coefficient data from a base quality level scale;
(b) decompressing refinements to the macroblock attributes and additional transform coefficient data for the next higher quality level scale in the hierarchy;
(c) repeating step (b) for progressively higher quality resolution scales in the hierarchy until the target quality resolution scale is reached; and
(d) combining the transform coefficient data which have been decompressed to produce a transform representation of the moving image.

* * * * *